(12) United States Patent
Roberts (10) Patent No.: US 6,279,106 B1
(45) Date of Patent: *Aug. 21, 2001

(54) METHOD FOR REDUCING BRANCH TARGET STORAGE BY CALCULATING DIRECT BRANCH TARGETS ON THE FLY

(75) Inventor: James S. Roberts, Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,721

(22) Filed: Sep. 21, 1998

(51) Int. Cl.$^7$ .................................................. G06F 9/38
(52) U.S. Cl. ............................................................ 712/239
(58) Field of Search .................................. 712/233, 236, 712/239

(56) References Cited

U.S. PATENT DOCUMENTS

| | | | |
|---|---|---|---|
| 5,088,030 | 2/1992 | Yoshida | 3/231.8 |
| 5,737,590 | 4/1998 | Hara | 712/238 |
| 5,995,749 | * 11/1999 | Tran | 395/586 |
| 6,061,786 | * 5/2000 | Witt | 712/237 |

FOREIGN PATENT DOCUMENTS

| | | |
|---|---|---|
| 0 253 364 | 1/1988 | (EP). |
| 98/22873 | 5/1998 | (WO). |

OTHER PUBLICATIONS

Calder et al., "The Precomputed–Branch architecture: Efficient branches with compiler support," Journal of Systems Architecture, vol. 45, No. 9, Mar. 1999, pp. 651–679.

Chang et al., "Target Prediction for Indirect Jumps," Computer Architecture News, vol. 25, No. 2, May 1997, pp. 274–283.

Sakamoto et al., "Microarchitecture Support for Reducing Branch Penalty in a Superscaler Processor," Proceedings of the International Conference on Computer Design, ICC VLSI in Computers & Processors, Oct. 1996, pp. 208–216.

International Search Report for Application No. PCT/US99/07266 mailed Jul. 29, 1999.

* cited by examiner

Primary Examiner—John F. Niebling
Assistant Examiner—Stacy Whitmore
(74) Attorney, Agent, or Firm—Conley, Rose & Tayon, PC (57) ABSTRACT

A method for efficiently storing and determining predicted next fetch addresses is disclosed. Predicted fetch addresses are generated by a number of independent sources. Predicted fetch addresses for indirect branch instructions are stored in a indirect branch target cache. Predicted fetch addresses for direct branch instructions are calculated using an "on-the-fly" direct branch adder. Predicted fetch addresses for return instructions are stored in a return stack. Predicted fetch addresses for sequential instructions are calculated on-the-fly using a sequential address adder. A branch selector array is used to store selector bits that indicate which of the above sources should be selected for the next predicted fetch address. The selector bits each correspond to particular instruction bytes stored in an instruction cache. Predecode bits indicative of branch instructions and instruction boundaries may also be stored in the instruction cache. A microprocessor and computer system employing this method are also disclosed.

23 Claims, 7 Drawing Sheets

METHOD FOR REDUCING BRANCH TARGET STORAGE BY CALCULATING DIRECT BRANCH TARGETS ON THE FLY

CROSS REFERENCE AND RELATED APPLICATIONS

The following are related applications: U.S. patent application Ser. No. 08/752,691, by Thang M. Tran filed Nov. 19, 1996; U.S. patent application Ser. No. 09/067,990, by Thang M. Tran filed Apr. 29, 1998; U.S. patent application Ser. No. 08/972,988, by Thang M. Tran filed Nov. 19, 1997; U.S. patent application Ser. No. 08/957,596, by Michael T. Wisor and Rita M. O'Brien filed Dec. 1, 1993; U.S. patent application Ser. No. 09/158,440, by James S. Roberts, filed Sep. 21, 1998; U.S. patent application Ser. No. 09/157,647, by James S. Roberts, filed Sep. 21, 1998; U.S. patent application Ser. No. 09/157,626, by James S. Roberts, filed Sep. 21, 1998; U.S. patent application Ser. No. 09/157,719, by Rupaka Mahalingaiah, filed Sep. 21, 1998; U.S. patent application Ser. No. 09/165,968, by Paul K. Miller, filed Oct. 2, 1998.

BACKGROUND OF THE INVENTION

1. Field of the Invention

The present invention relates to storing branch target addresses in a microprocessor, and more particularly, to methods for caching indirect branch target addresses.

2. Description of the Related Art

Modem microprocessor designers continually attempt to improve the performance of their products. One method to increase the performance of a microprocessor is to increase the clock frequency at which it operates. However, as clock frequencies increase, each functional unit within the microprocessor has less time in which to perform its designated task. Thus, other methods have been employed to further increase performance at a given clock cycle frequency. Parallel execution is one such method. Parallel execution involves executing more than one instruction during each clock cycle. In order to implement parallel execution, many microprocessors use parallel functional units each configured to operate independently and in parallel.

Another method for increasing the performance of a microprocessor at a given clock cycle is out of order execution. Most programs depend upon their instructions executing in a particular order. This order is referred to as "program order". However, certain instructions within the program may execute out of program order as long as the desired functionality is still achieved. Instructions that may be executed out of order are those that do not "depend" upon the instructions around them. Microprocessors that implement out of order execution are able to determine which instructions do not depend on other instructions and therefore may be executed out of order.

There are several potential draw backs to executing instructions out of order. One drawback in particular is the use of branch instructions. Examples of branch instructions include conditional jump instructions (Jcc), unconditional jump instructions (JMP), return instructions (RET), and subroutine call instructions (CALL). These instructions make out of order execution particularly difficult because the microprocessor may be unable to determine whether or not instructions after the branch instruction should be executed.

Another method used to increase a microprocessor's performance at a given clock cycle is pipelining. Pipelining involves dividing the tasks the microprocessor must complete in order to execute an instruction. The tasks are divided into a number of stages that form an instruction processing "pipeline". The stages are typically serial in nature. For example the first stage may be to "fetch" an instruction stored in an instruction cache, while the second stage may be to align the instruction and convey it to decode units for decoding or functional units for execution. Pipelines allow long streams of instructions to be executed in fewer clock cycles. The advantages of a pipelined microprocessor stem from its ability to process more than one instruction at a time. For example, a first instruction may be decoded at the same time a second instruction is being fetched from the instruction cache.

However, as with out of order execution, pipelined microprocessors may suffer performance setbacks as the result of branch instructions. Branch instructions may cause the pipeline "stall" because the initial stages of the pipeline are unable to determine which instructions to fetch until after the branch instruction has been executed. For example, a conditional branch instruction is either "taken" or "not taken". If the branch instruction is not taken, then the instruction immediately following the branch instruction in program order is executed. Alternatively, if the branch instruction is taken, then a different instruction at some offset relative to the branch target address is executed. In pipelined microprocessors, it is difficult for initial or fetch stages of the pipeline to determine whether to fetch the "taken" or "not taken" target instruction until the branch instruction has completed execution. Thus, the microprocessor pipeline may stall or form "bubbles" (i.e., idle clock cycles that propagate through the pipeline) while the initial stages await the results of the branch instruction.

In order to prevent stalls or bubbles from forming in the pipeline, many microprocessors implement a branch prediction scheme. Branch prediction involves predicting whether each branch instruction is taken or not taken before the branch instruction actually completes execution. While a number of different algorithms may be used, most rely upon storing the taken/not taken history of the particular branch instruction. For example, when a branch instruction is executed and taken, branch prediction hardware will store that information so that the next time the branch instruction is fetched, the pipeline will automatically assume the instruction is taken based upon its previous performance.

While storing branch prediction information reduces the probability of a stall or bubble forming, it has disadvantages also. One disadvantage is the complex hardware required to maintain and update the branch history information. A second disadvantage is the space required to store the branch history information. Die space within microprocessors is a relatively scarce resource, thus using large amounts of space to store branch predictions is disadvantageous. As instruction caches grow in size, more branch instructions may be stored therein. This in turn requires more storage space for branch history prediction information. Furthermore, modern software tends to have a high concentration of branch instruction (e.g., one out of every four instructions). This high concentration, coupled with the inability to know exactly how many branches are stored in the instruction cache, typically results in large amounts of die space being devoted to storing branch history information.

For these reasons, a method for efficiently storing branch prediction and history information is desired. In particular, a method for reducing the amount of storage space needed for branch history and prediction information is particularly desirable.

SUMMARY OF THE INVENTION

The problems described above may in part be solved by a microprocessor and branch prediction unit in accordance with the present invention. In one embodiment, a microprocessor configured to efficiently store branch prediction information may comprise an instruction cache and a branch prediction unit. The branch prediction unit may be coupled to the instruction cache and may comprise: an indirect branch target cache, a direct branch adder, and a branch selector array. The indirect branch target array may be configured to store predicted branch target addresses for indirect branch instructions, while the direct branch adder may be configured to calculate the branch target addresses for direct branch instructions. The branch selector array may be coupled to the indirect branch target cache and may be configured to store a plurality of selector bits. In one embodiment, the selector bits may correspond to particular instruction bytes stored in the instruction cache. The selector bits indicate a source for the predicted next fetch address associated with the particular instruction bytes.

In another embodiment, the branch prediction unit may further comprise a multiplexer configured to select the predicted next fetch address from either the direct branch adder, the indirect branch target cache, or another source. The multiplexer may be configured to make its selection based upon the value of the selector bits that correspond to the current fetch address. The branch prediction unit may also comprise a sequential address adder coupled to the multiplexer. The sequential address adder may be configured to generate a predicted next sequential fetch address by summing a portion of the current fetch address and a constant corresponding to the fetch block or cache line size of the instruction cache. A return stack may also be utilized to store fetch address corresponding to instructions immediately following call instructions.

A method for storing predicted next fetch addresses in a microprocessor is also contemplated. In one embodiment, the method may comprise storing predicted branch target addresses for indirect branch instructions in an indirect branch target cache. In addition, selector bits corresponding to particular instruction bytes are stored in a branch selector array. For direct branch instructions, the predicted direct branch target addresses are calculated "on-the-fly". Once the predicted indirect branch address has been looked up and the predicted direct branch address had been calculated, the predicted next fetch address is selected based upon the selector bits.

In one embodiment, predecode bits are calculated and stored along with the instruction bytes. The predecode bits may be used to calculate the predicted direct branch target addresses, which may be calculated by: determining a first offset from the current fetch address to the first direct branch instruction that is predicted taken; detecting a second offset stored as immediate data within the direct branch instruction; and then summing the current fetch address, the first offset, and the second offset.

In another embodiment, a predicted sequential address may also be calculated by summing a portion of the current fetch address with a constant representing the cache line size or fetch block size of the instruction cache.

A computer system configured to efficiently store branch prediction information is also contemplated. In one embodiment, the computer system comprises a microprocessor as described above and a bus bridge. The bus bridge may be coupled to the microprocessor via a high-speed CPU bus. Peripherals, such as a modem, may be coupled to the microprocessor via the bus bridge. In another embodiment, the computer system may comprise a second microprocessor coupled to the first via the CPU bus.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will be described in detail herein. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
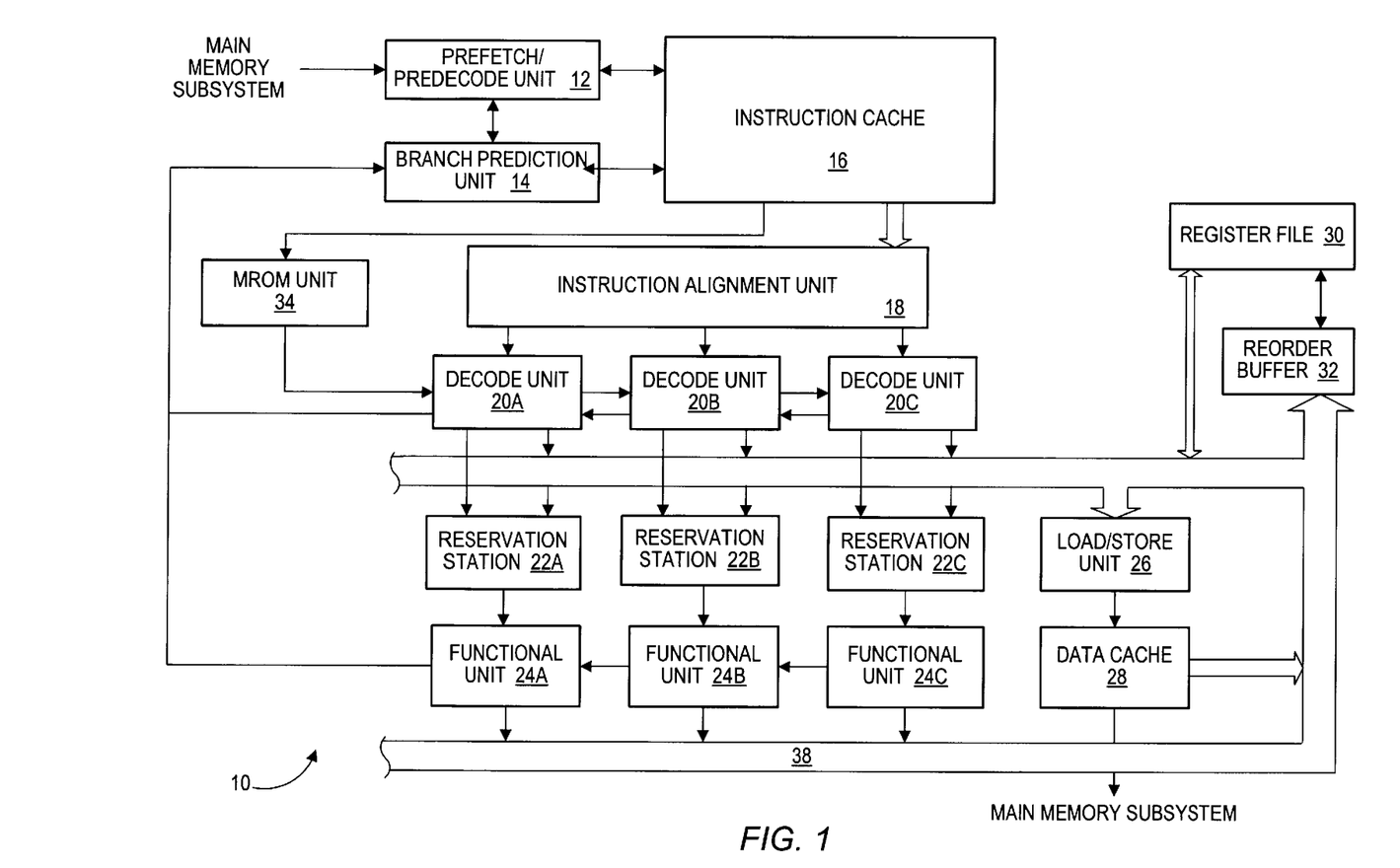
FIG. 1 is an illustration of one embodiment of a microprocessor.

Turning now to FIG. 1, a block diagram of one embodiment of an example microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and MROM unit 34. Elements referred to herein with a particular reference number followed by a letter may be collectively referred to by the reference number alone. For example, reservation stations 22A–22C may be collectively referred to as reservation stations 22.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Branch prediction unit 14 is also coupled to instruction alignment unit 18 and functional units 24A–C. Instruction cache 16 is further coupled to MROM unit 34 and instruction alignment unit 18. Instruction alignment unit 18 is in turn coupled to load/store unit 26 and to respective decode units 20A–C. Respective decode units 20A–C are coupled to reservation stations 22A–C, which are further coupled to respective functional units 24A–C. Additionally, instruction alignment unit 18 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to instruction alignment unit 18.

Instructions are prefetched from main memory by prefetch/predecode unit 12. Prefetch/predecode unit 12 predecodes the variable-length instructions to fixed length instructions which are then stored in instruction cache 16. Instructions may be prefetched and predecoded before they are actually requested by using a prefetch scheme. A variety of prefetch schemes may be employed by prefetch/predecode unit 12.

Microprocessor 10 may employ branch prediction in order to speculatively fetch instructions subsequent to conditional branch instructions. Branch prediction unit 14 is included to perform branch prediction operations. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched to branch prediction unit 14. This allows branch prediction unit 14 to determine which branch target addresses to select when forming a branch prediction. Instruction alignment unit 18 and functional units 24 provide update information to branch prediction unit 14. Instruction alignment unit 18 may be configured to detect branch instructions which were not predicted by branch prediction unit 14. Functional units 24 execute the branch instructions and determine if the predicted branch direction was mispredicted. The branch direction may be "taken", in which case subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14. Before describing more details of branch prediction unit 14 and its interaction with instruction cache 16, general aspects and possible implementations of example microprocessor 10 will be described.

Instruction cache 16 is a high speed cache memory provided to store instructions received from prefetch/predecode unit 12. Stored instructions are then fetched from instruction cache 16 and forwarded to instruction alignment unit 18. In one embodiment, instruction cache 16 may be configured as a set-associative structure. Instruction cache 16 may additionally employ a way prediction scheme in order to speed access times. For example, instead of accessing tags identifying each line of instructions and comparing the tags to the fetch address to select a way, instruction cache 16 may predict the way that is accessed. In this manner, the way is speculatively selected prior to accessing the array. Using way prediction, the access time of instruction cache 16 may be similar to a direct mapped cache. After the instruction bytes have been read, a tag comparison is performed for verification. If the way prediction is incorrect, the correct instruction bytes are fetched and the incorrect instruction bytes (which are further down the processing pipeline) are discarded. It is noted that instruction cache 16 may be implemented in fully associative, set associative, or direct-mapped configurations.

MROM unit 34 is a read-only memory that is configured to store sequences of "fast-path" instructions. Fast path instructions are instructions that may be decoded and executed by decoders 20A–C and functional units 24A–C. In contrast, "MROM instructions" are instructions which are too complex for direct decoding or execution by decoders 20A–C and functional units 24A–C. When instruction cache 16 outputs an MROM instruction, MROM unit 34 responds by outputting a sequence of fast path instructions. More specifically, MROM unit 34 parses and translates the MROM instruction into a subset of defined fast path instructions to effectuate the desired operation. MROM unit 34 dispatches the subset of fast path instructions to decode units 20A–C.

Once instruction bytes are fetched from instruction cache 16, they are conveyed to instruction alignment unit 18. Instruction alignment unit 18 routes the instructions to one of decode unit 20A–C. Register operand information is also detected and routed to register file 30 and reorder buffer 32. Additionally, if the instructions require one or more memory operations to be performed, instruction alignment unit 18 dispatches the memory operations to load/store unit 26. Each decoded instruction is dispatched to reservation stations 22 along with operand address information and displacement or immediate data which may be included with the instruction.

Microprocessor 10 supports out-of-order execution, and thus employs reorder buffer 32 for the following tasks: to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register. The temporary storage location stores the speculative register state that results from the speculative execution of an instruction. If a branch prediction is incorrect, the results from the speculatively-executed instructions along the mispredicted path can be invalidated in the reorder buffer 32 before they are written to register file 30. Similarly, if a particular instruction causes an exception, instructions subsequent to the exception-causing instruction may be discarded. In this manner, exceptions are "precise" (i.e., instructions subsequent to the exception-causing instruction are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The decoded instructions and immediate or displacement data provided at the outputs of instruction alignment unit 18 are routed directly to respective reservation stations 22. In one embodiment, each reservation station 22 is capable of holding instruction information (i.e., decoded instructions as well as operand values, operand tags and/or immediate data) for up to three pending instructions awaiting issue to the corresponding functional unit. It is noted that for the embodiment shown in the figure, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. The x86 register file includes eight 32-bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32-bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register.

If following decode of a given instruction it is determined that reorder buffer 32 has a previous location or locations assigned to a register used as an operand in the given instruction, reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions whenever one or more instructions are dispatched by instruction alignment unit 18. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each functional units 24A–C is configured to perform integer arithmetic operations of addition and subtraction, as well as shifts, rotates, logical operations, and branch operations. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes a fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. When the buffer is full, instruction alignment unit 18 waits until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations may be performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight-way set-associative structure. Similar to instruction cache 16, data cache 28 may employ a way prediction mechanism. It is understood that data cache 28 may be implemented in a variety of specific memory configurations, including set-associative and direct-mapped configurations.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Branch Prediction Unit

Figure 2:
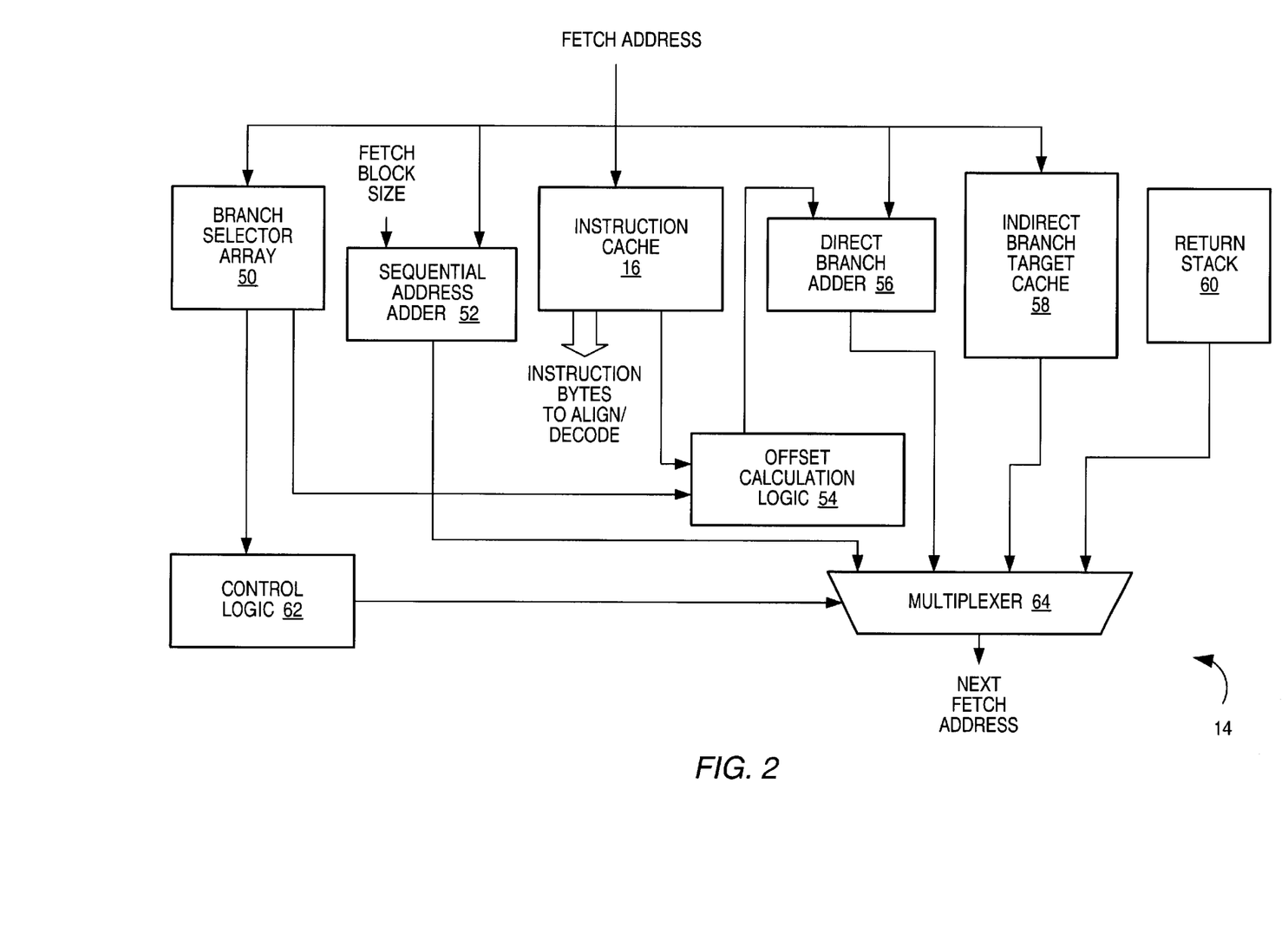
FIG. 2 is an illustration of one embodiment of the branch prediction unit from the microprocessor of FIG. 1.

Turning now to FIG. 2, details of one embodiment of a branch prediction unit 14 are shown. As the figure illustrates, in this embodiment branch prediction unit 14 comprises a branch selector array 50, a sequential address adder 52, offset calculation logic 54, a direct branch adder 56, an indirect branch target cache 58, a return stack 60, control logic 62, and a multiplexer 64.

Generally, branch prediction unit 14 receives fetch addresses from functional units 24A–C and in response outputs a predicted next fetch address. The predicted next fetch address is then routed to instruction cache 16. If the predicted next fetch address misses in instruction cache 16, then the predicted next fetch address is routed to prefetch/predecode unit 12. Prefetch/predecode unit 12 then begins the process of accessing the main memory subsystem and storing a predetermined number of instruction bytes residing at the predicted next fetch address into instruction cache 16.

During the operation of branch prediction unit 14, all or a portion of the received fetch address may be routed to a number of different locations in parallel. For example, in the embodiment illustrated in the figure, the fetch address is conveyed to branch selector array 50, sequential address adder 52, instruction cache 16, direct branch adder 56, and indirect branch target cache 58.

Branch selector array 50 is configured to store a plurality of selection bits, each corresponding to a particular instruction byte within instruction cache 16. In one embodiment, branch selection array 50 may be configured to mirror the structure of instruction cache 16. For example, if instruction cache 16 is configured as a four-way set associative cache, branch selector array 50 may also be configured as four-way set associative. Both branch selector array 50 and instruction cache 16 may be accessed using the same tag or portion of the fetch address. The selector bits output by branch selector array 50 are routed to control logic 62. Based upon the selector bits, control logic 62 directs multiplexer 64 to select the next predicted fetch address from one of four potential sources. In one embodiment, multiplexer 64 selects the predicted next fetch address from the following four possible addresses: (1) a calculated sequential address, (2) a calculated direct branch target address, (3) a stored indirect branch target address, and (4) a stored return address. Each of these four potential addresses is discussed individually below. Note, as used herein the term fetch block refers to the block of instruction bytes output by instruction cache 16 in response to receiving a fetch address that hits in instruction cache 16. In some implementations, a fetch block may equal a cache line. In other implementations, instruction cache 16 may output some fraction of a cache line (e.g., half of a cache line), in which case a cache line may comprise a number of fetch blocks.

The first of the four potential address, i.e., the calculated sequential address, is selected when the selector bits indicate that there is no taken branch after the fetch address in the fetched cache line. For example, if a fetched cache line has no branch instructions, then the program will continue execution beyond the end of the current fetched cache line into the next sequential cache line. The fetch address of the next sequential cache line is calculated by sequential address adder 52. Sequential address adder 52 is configured to receive the fetch address (or a portion thereof) and add to it a constant 66. Constant 66 equals the fetch block size of instruction cache 16. For example, if a block of sixteen instruction bytes is output by instruction cache 16 each time a fetch address that hits is received, then constant 66 would equal sixteen. By adding the fetch block size to the fetch address, the address of the next sequential fetch block may be calculated. Note, in some embodiments the lower order bits of the fetch address (e.g., index bits indicative of the byte offset within the fetch block) may be zeroed out before or after the summing occurs. This ensures that the next sequential address corresponds to the beginning of a cache line (or fetch block, if there are multiple fetch blocks within a cache line).

The second of the four potential addresses, i.e., the calculated direct branch target address, is selected by multiplexer 64 when the selector bits received by control logic 62 indicate the presence of a direct branch instruction that is predicted taken. A direct branch instruction is a branch instruction in which the offset (i.e., the number of bytes to jump) is contained within the instruction as immediate data. For example, in the x86 instruction set the unconditional near jump instruction with an immediate offset (e.g., JMP 014C) is an example of a direct branch instruction. The immediate offset (014C in the previous example) indicates the number of bytes to be added to or subtracted from the instruction pointer (EIP) of the instruction immediately following the branch instruction. Direct branch adder 56 is responsible for calculating the direct branch target address. In one embodiment, direct branch adder 56 sums the following three components to generate the predicted direct branch address: (1) the fetch address, (2) the offset from the current fetch address to the instruction immediately following the direct branch instruction, and (3) the offset stored as immediate data within the direct branch instruction. The fetch address acts as a starting point for the calculation. The offset from the current fetch address to the instruction immediately following the direct branch address is added to the starting point to form an effective EIP value. The offset stored as immediate data is then added to the effective EIP value to generate the predicted direct branch target address. Note that adder 56 may be implemented as one of any number of different types of adders (e.g., a carry-propagate adder or a carry-save adder) or as a combination of different adder types. Furthermore, the addition operations may be performed in any order or in parallel. The two offset values used by direct branch adder 56 are calculated by calculation logic unit 54, which determines the offset values from instruction bytes received from instruction cache 16. This calculation is described in greater detail below.

The third of the four potential addresses, i.e., the stored indirect branch target address, is selected by multiplexer 64 when the selector bits received by control logic 62 indicate the presence of an indirect branch instruction that is predicted taken. An indirect branch instruction is a branch instruction in which the offset is not stored as immediate data. For example, an unconditional jump instruction in which the offset is stored in memory (e.g., JMP [9912]) or a register (e.g., JMP AX) may be considered an indirect branch. In contrast with direct branch instructions, it may be more difficult to calculate predicted branch target addresses "on the fly" (or out of program order) for indirect branches because of the extra time required to retrieve the desired offset from memory or a register. Thus, predicted indirect branch addresses are stored in indirect branch target cache 58. Indirect branch target cache 58 is configured to receive the current fetch address and in response output a predicted indirect branch target address to multiplexer 64. When control logic 62 detects an indirect branch instruction that is predicted taken, it directs multiplexer 64 to select the predicted indirect branch target address output by indirect branch target cache 58.

The fourth potential address is the stored return address. The stored return address is selected by multiplexer 64 when the selector bits received by control logic 62 indicate the presence of an return instruction. Return instructions (e.g., RET and RETF in the x86 instruction set) restore the EIP to the value it held before the preceding call instruction. Call and return instructions are typically used to jump to and return from procedures or subroutines. Call instructions store (or push) the current instruction pointer to a stack in memory, while return instructions restore the instruction pointer to its value from before the last call instruction by reading (or popping) the stored instruction pointer from the memory stack. In the embodiment shown, return stack 60 is configured to store instruction pointers corresponding to call instructions. When the selector bits received by control logic 62 indicate a return instruction, control logic 62 causes multiplexer 64 to select the predicted return address at the top of return stack 60. Return stack 60 may be configured to increment its top of stack pointer whenever a predicted return address is selected by multiplexer 64 to enable proper stack operation. Similarly, when a call instruction is detected and the corresponding instruction pointer is stored to return stack 60, the top of stack pointer may be decremented.

Figure 3:
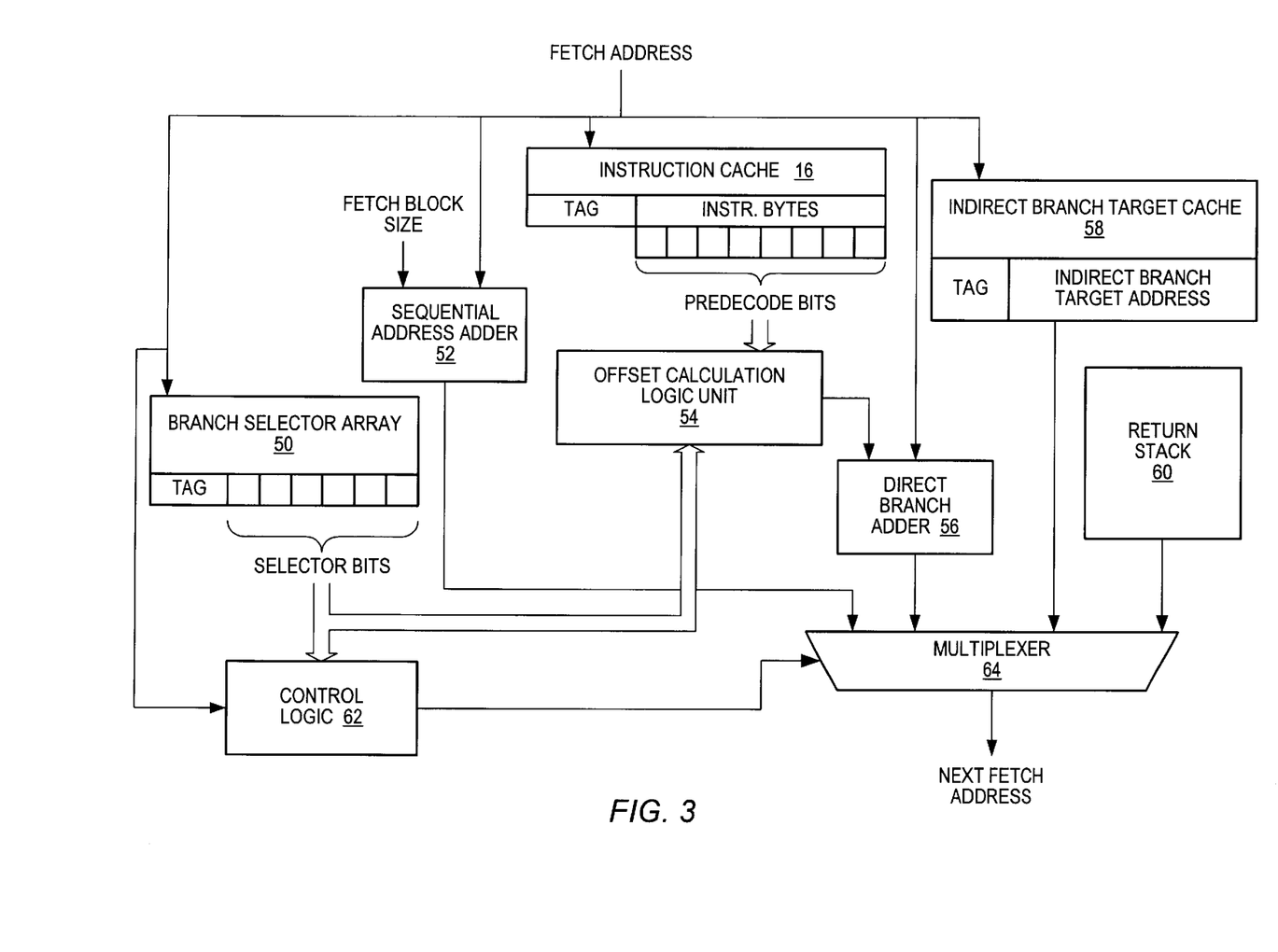
FIG. 3 is a diagram illustrating more details of one embodiment of the branch prediction unit from FIG. 2.

Turning now to FIG. 3, various features of one particular embodiment of branch prediction unit 14 are shown. As the figure illustrates, branch selector array 50, instruction cache 16, and indirect branch target cache 58 may each store tags corresponding to the stored information. Indirect branch target cache may mirror the structure of instruction cache 16 and store one or more indirect branch target addresses per cache line or fetch block. In another embodiment, indirect branch target cache 58 may be fully associative and store up to a predetermined number of predicted indirect branch target addresses. For example, indirect branch target cache 58 may be configured to use a first-in first-out (FIFO) replacement scheme in order to store a predetermined number of the most recently taken indirect branch target addresses. In some embodiments indirect branch target cache 58 may store only indirect branch target addresses, which may render indirect branch target cache 58 smaller than other branch target caches storing other types of target addresses in addition to indirect branch target addresses. Furthermore, since indirect branches may occur less frequently than direct branches, this may further mitigate any potential disadvantage associated with implementing a branch target cache having fewer storage locations.

As the figure also illustrates, offset calculation unit 54 may be configured to receive predecode bits from instruction cache 16. As previously noted, predecode bits are generated by predecode unit 12 and may be used to store information relevant to the alignment and decoding of instructions stored in instruction cache 16. Offset calculation unit 54 may also be configured to receive selector bits from branch selector array 50. In one embodiment, branch selector array 50 may be configured to output only the selector bits occurring after the fetch address. In another embodiment, branch selector array 50 may be configured to output all the selector bits corresponding to each byte in the selected cache line or fetch block within instruction cache 16. Furthermore, both control logic 62 and offset calculation unit 54 may be configured to receive all or only a portion of the selector bits output by branch selector array 50. In one embodiment, branch selector array may be configured to output the selector bits corresponding to the fetch address directly to the control inputs of multiplexer 64, thereby reducing the complexity of (or eliminating entirely) control logic 62.

When a branch misprediction is detected, functional units 24 may provide the correct branch target address (and corresponding taken or not taken information) to branch prediction unit 14. Branch prediction unit 14 may then be configured to update the corresponding information in branch selector array 50 and indirect branch target cache 58. Branch prediction unit 14 and branch selector array 50 may also be configured to reset any selector bits that correspond to replaced cache lines or fetch blocks within instruction cache 16. Return stack 60 may also have valid bits associated with each of its entries. Furthermore, additional storage arrays might be used to store different sizes of offsets (e.g., separate eight, sixteen, and thirty-two bit arrays) in lieu of storing the entire indirect branch target address in indirect branch target array 58. This embodiment may, however, use an additional adder to perform the indirect branch target address calculation using the stored offsets.

Figure 4:
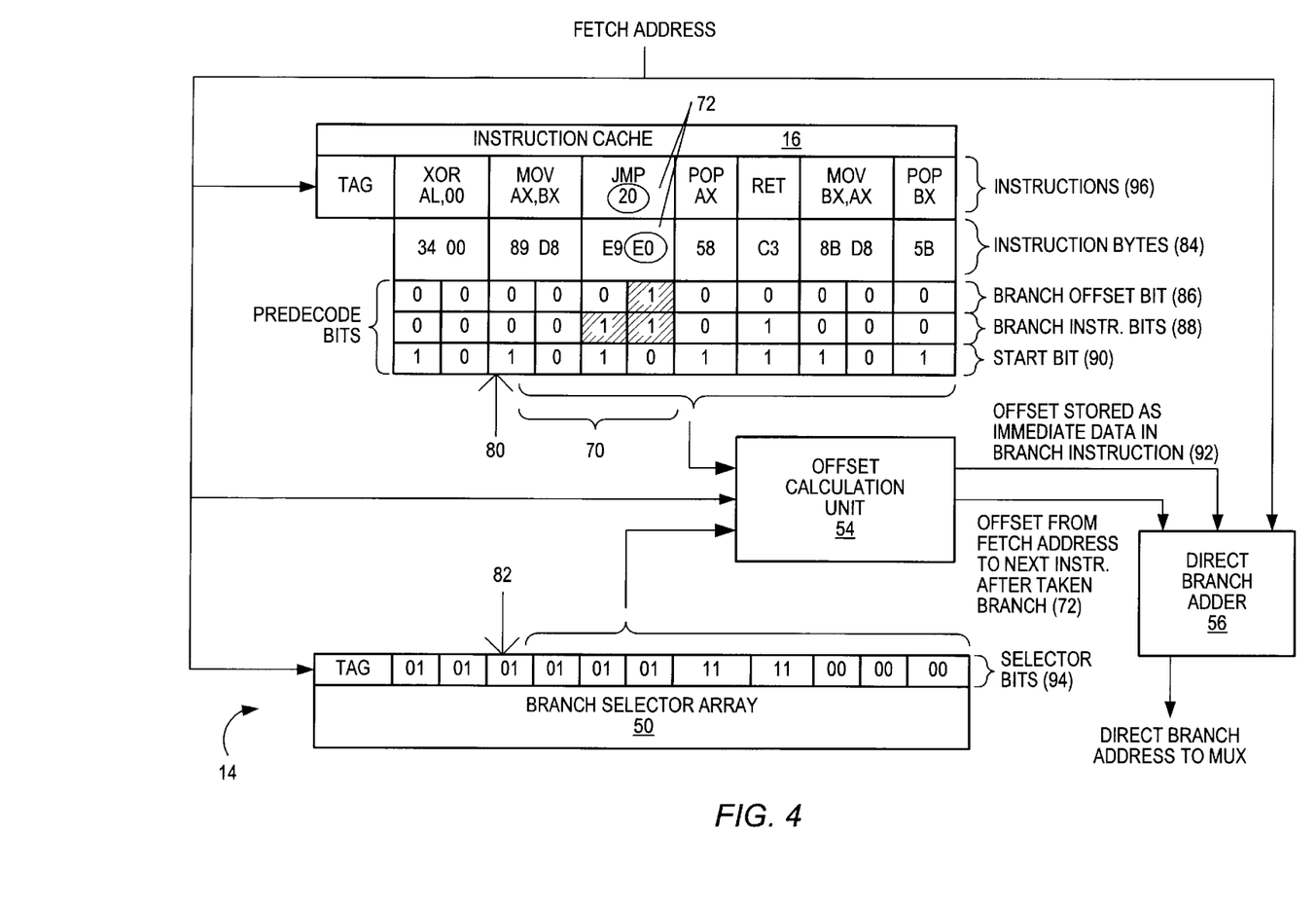
FIG. 4 is a block diagram illustrating additional details of one embodiment of the branch prediction unit from FIG. 2.

Turning now to FIG. 4, more details of the operation of one embodiment of branch prediction unit 14 are shown. As the figure illustrates, in one embodiment instruction cache 16 may store instruction bytes 84, branch offset bits 86, branch instruction bytes 88, and start bits 90. Note that unassembled instructions 96 are shown merely for explanatory purposes and are not actually stored within instruction cache 16. Branch offset bits 86, branch instruction bytes 88, and start bits 90 are all predecode bits generated by predecode unit 12. Each predecode bit corresponds to one instruction byte as shown in the illustration. Branch offset bits 86 are asserted when the corresponding instruction bytes comprise part of a direct branch instruction's immediate offset. For example, the instruction JMP 20 represents an unconditional jump to an address twenty bytes after the start of the next instruction (i.e., POP AX). The instruction JMP 20 is assembled in hexadecimal machine code as E9 E0, wherein E9 is the opcode for an unconditional jump with an immediate eight bit offset and E0 is the two's complement representation of the offset (20). The offsets are indicated by circles 72 in the figure. Since bytes E0 represent immediate offset data for a direct branch instruction, the corresponding branch offset bit 86 is set (represented by a shaded block).

Similarly, branch instruction bits 88 are asserted when the corresponding instruction bytes are part of a branch instruction. For example, both instructions JMP 20 and RET are branch instructions. Thus, their corresponding branch instruction bits 86 are asserted. As previously described, start bits 90 are asserted only when the corresponding instruction byte is the first byte of an instruction.

The figure also illustrates an example of one type of encoding for selector bits 94. The encoding used in the figure utilizes two selector bits for each instruction byte stored within instruction cache 16. Note in other embodiments selector bits 94 may be stored for a subset of the instruction bytes in instruction cache 16, e.g., two selector bits for every other instruction byte. Table 1 illustrates the encoding used in the example shown in the figure.

TABLE 1

| Selector bit encodings | |
|---|---|
| 00 | branch instruction not taken, select sequential address |
| 01 | direct branch instruction taken, select calculated direct branch address |
| 10 | indirect branch taken, select indirect branch address from indirect branch target cache |
| 11 | return instruction, select return address from return stack |

In the figure, arrows 80 and 82 represent an example fetch address. Using the example fetch address, the operation of this embodiment of branch prediction unit 14 may be illustrated. The fetch address is received by instruction cache 16, offset calculation unit 54, direct branch adder 56, and branch selector array 50. In response, instruction cache 16 outputs instruction bytes 84 beginning with the MOV AX, BX instruction to instruction alignment unit 18. In parallel, the corresponding predecode bits (which may also be selectively routed to alignment unit 18) are conveyed to offset calculation unit 54. Also in parallel, branch selector array 50 conveys selector bits 94 (corresponding the instruction bytes output by instruction cache 16) to offset calculation unit 54.

After receiving the fetch address, predecode bits, and selector bits, offset calculation unit 54 calculates two offsets. The first offset is the number of bytes from the fetch address 80 to the end of the first taken branch instruction (represented by bracket 70 in the figure). This may be determined in a number of ways, e.g., by scanning for the first set branch instruction bit having corresponding selector bits that are asserted. This offset is conveyed to direct branch adder 56. The second offset is the offset stored as immediate data within the direct jump instruction (represent by circles 72). In one embodiment, offset calculation unit 54 may receive instruction bytes from instruction cache 16 in addition to the predecode bits. Offset calculation unit 54 may then select out the immediate offset data 72 from the instruction bytes by scanning for asserted branch offset bits 86 corresponding to the first taken branch instruction after the fetch address. Note that offset calculation unit 54 may scan for the first "taken" branch instruction to ensure that branch instructions that are "not taken" will not adversely affect the prediction. Further note that while selector bits corresponding to a number of instruction bytes may be conveyed to offset calculation unit 54, in one embodiment only the selector corresponding to the fetch address are conveyed to control logic 62 (or multiplexer 64). In the example used above, selector bits having the value 01 (corresponding to instruction bytes at fetch address 80 and 82) would be output to multiplexer 64, indicating that the output from direct branch adder 56 should be selected.

Assuming instead that the fetch address was that of the instruction POP BX, the final pair of selector bits (having a value 00) would be conveyed to multiplexer 64, indicating that the next sequential fetch address should be selected (generated by sequential address adder 52). Similarly, if the fetch address was that of the instruction RET, then selector bits having a value 11 would be conveyed to multiplexer 64, indicating that the return address stored at the top of return stack 60 should be selected.

Note that other configurations of selector bits 94 are also contemplated. For example, in one embodiment branch prediction unit may be implemented without return stack 60. Similarly, other predecode information may also be stored in addition to or in lieu of the predecode information described above, e.g., a valid bit may be stored indicating whether the corresponding branch prediction information is valid. Similarly, when a reset occurs branch selector array 50 may be configured to clear (e.g., 00) all selector bits 94. Instruction cache may also be configured to assert a control signal to predecode unit 12 when a cache line is being overwritten. If branch selector array 50 has a structure mirroring that of instruction cache 16, then branch selector array 50 may clear all selector bits 94 that correspond to the overwritten cache line.

Figure 5:
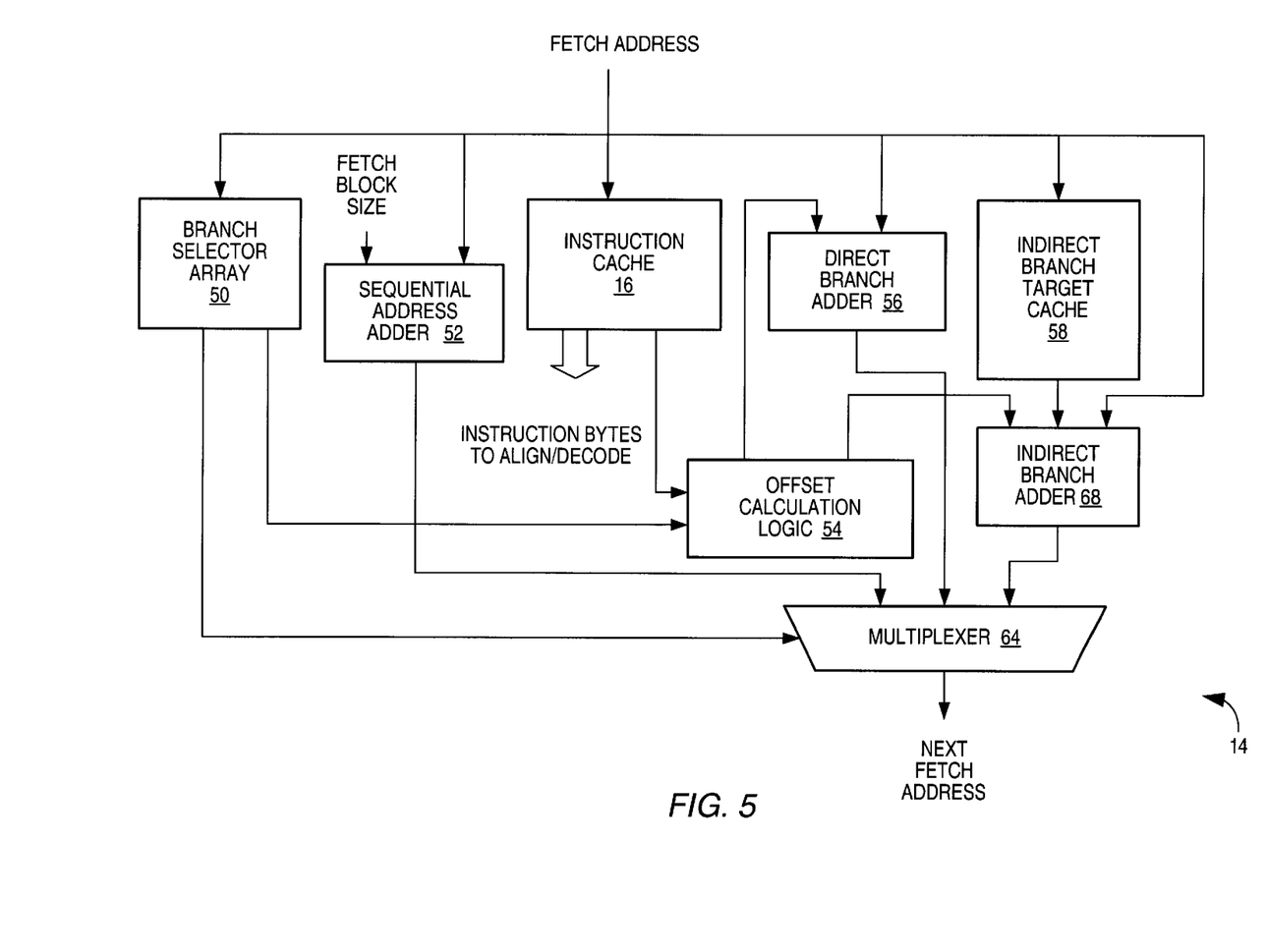
FIG. 5 is a block diagram illustrating another embodiment of the branch prediction unit from FIG. 2.

Turning now to FIG. 5, another embodiment of branch prediction unit 14 is illustrated. In this embodiment, the selector bits from branch selector array 50 are routed directly to multiplexer 64 to select which source will provide the next predicted fetch address. If the selector bits are incorrect, or if one of the stored addresses are incorrect (as later detected by functional units 24A–C), the incorrect information is updated with the correct information received from functional units 24A–C. For example, if selector bits 94 incorrectly indicate that a particular instruction is taken, upon detecting the branch misprediction functional units 24A–C will notify branch prediction unit 14 that the selector bits are incorrect and need to be updated.

An additional feature of this embodiment is that indirect branch targets are stored in the form of offsets. The offsets are then added to the fetch address by indirect branch adder 68. This calculation may be performed similarly to the calculation performed by direct branch adder 56. Further note that this embodiment does not use return stack 60.

Figure 6:
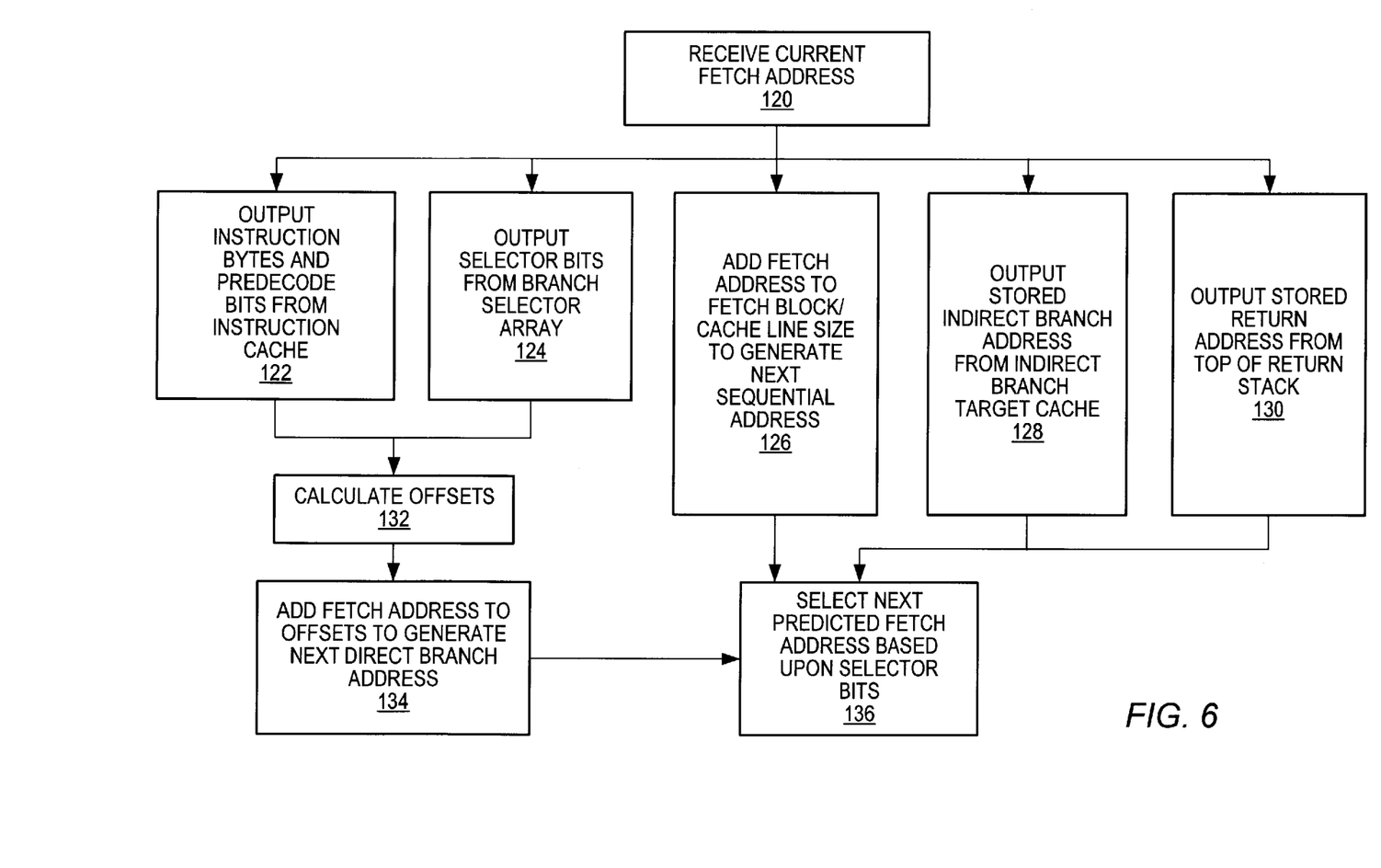
FIG. 6 is a flow chart illustrating one embodiment of a method for storing predicted next fetch addresses in a microprocessor.

Turning now to FIG. 6, a flowchart illustrating one embodiment of a method for storing predicted next fetch addresses in a microprocessor is shown. In this embodiment, after current fetch addresses are received (step 120) a number of functions may be performed in parallel: (1) instruction bytes and predecode bits are output from instruction cache 16 (step 122); (2) selector bits are output from branch selector array 50 (step 124); (3) the fetch address is added to the fetch block/cache line size to generate the next sequential fetch address (step 126); (4) stored indirect branch instruction addresses are output from indirect branch target cache 58; and (5) the return address from the top of return stack 60 is output. Next, offset calculation unit 54 calculates the offset from the fetch address to the first predicted taken direct branch instruction and detects offsets stored as immediate data within direct branch instructions (step 132). Once calculated, the offsets are then added to the fetch address to generate the predicted next direct branch instruction (step 134). Finally, the next predicted fetch address is selected based upon the selector bits from branch selector array 50 (step 136).

Note that some of the steps illustrated are optional (e.g., step 130). Further note that the order of the steps may be varied and that different functions within the steps may be performed in different sequences. For example, predecode bits may be available from the output of the instruction cache (step 122) before the instruction bytes are. Thus, the calculations for each offset may be started at different times. Further note that additional steps may be added in different embodiments. For example, as previously noted some embodiments may store indirect branch target addresses as offsets in lieu of full addresses. In such embodiments an extra step may be utilized to add the stored offset to the fetch address and the offset generated by offset calculation logic 54.

Example Computer System

Figure 7:
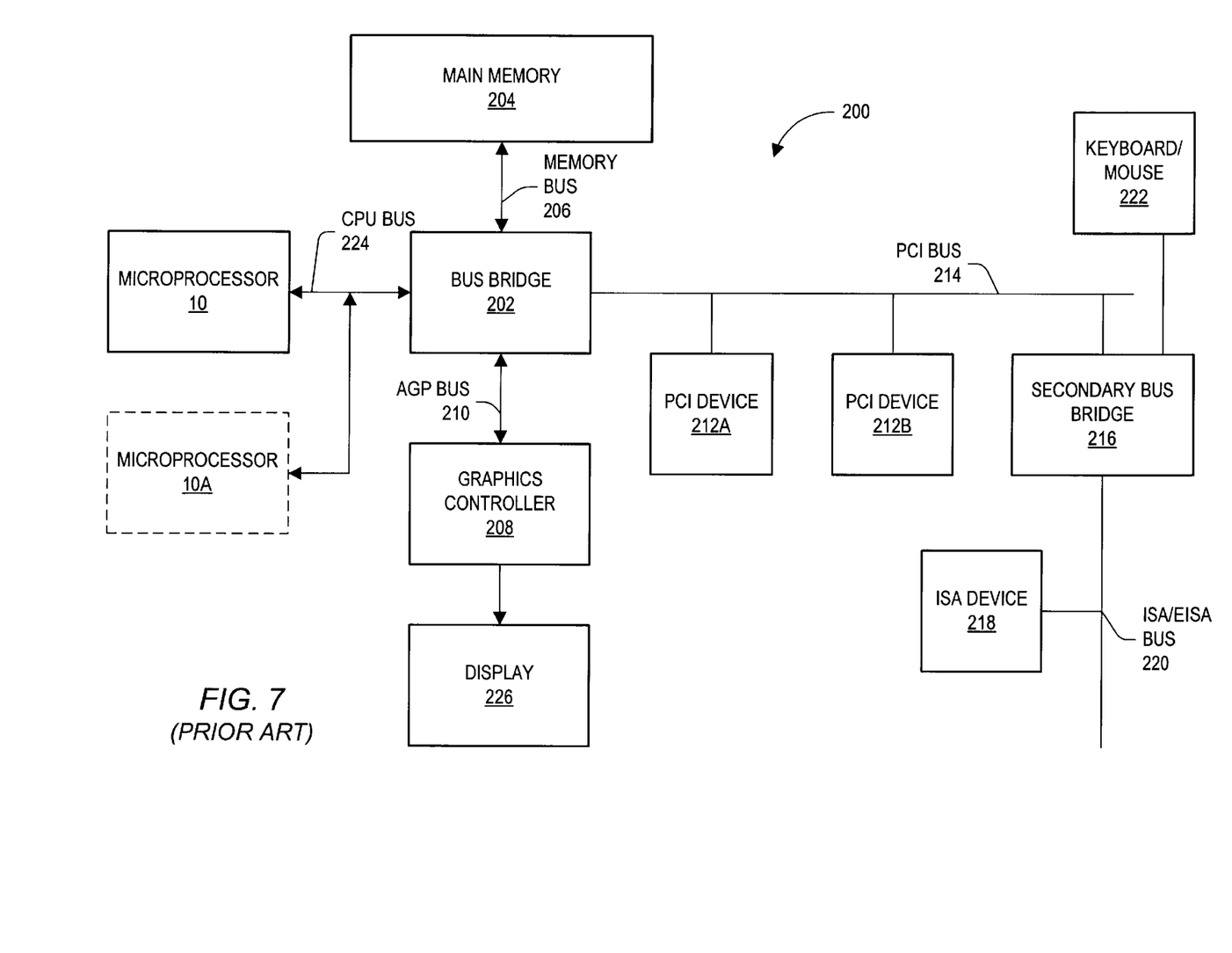
FIG. 7 is a block diagram of one embodiment of a computer system configured to use one embodiment of the microprocessor from FIG. 1.

Turning now to FIG. 7, a block diagram of one embodiment of a computer system 200 configured to utilize one embodiment of microprocessor 10 and branch prediction unit 14 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   an instruction cache configured to receive and store instruction bytes, wherein the instruction cache is configured to receive a fetch address and in response thereto output one or more of the instruction bytes corresponding to the fetch address, a branch selector array configured to store a plurality of selector bits, wherein each selector bit corresponds to a particular instruction byte stored in the instruction cache, wherein the branch selector array is configured to receive the fetch address and in response thereto output one or more corresponding selector bits that are indicative of a source for a predicted next fetch address, a sequential address adder configured to sum the fetch address with a fetch block size to generate a next sequential address, an indirect branch target cache configured to store predicted branch target addresses for indirect branch instructions stored in the instruction cache, wherein the indirect branch target cache is configured to receive the fetch address and output a corresponding indirect branch address, a direct branch adder configured to sum the fetch address with an offset from the instruction bytes output by the instruction cache to calculate a direct branch address, and a multiplexer configured to receive the one or more corresponding selector bits from the branch selector array, wherein the multiplexer is configured to select either the next sequential address, the direct branch address, or the indirect branch address based on the selector bits.

2. The microprocessor as recited in claim 1, wherein the sequential address adder, the direct branch adder, and the indirect branch target cache are each configured to calculate the next sequential address, the direct branch address, and the indirect branch address, respectively, in parallel.

3. The microprocessor as recited in claim 2, further comprising an offset calculation logic unit configured to calculate the offset from the instruction bytes output by the instruction cache, wherein the offset calculation logic unit is configured calculate the offset based on the selector bits.

4. The microprocessor as recited in claim 3, where two of said selector bits correspond to each instruction byte stored in said instruction cache, wherein said two bytes are indicative of whether the corresponding instruction is (i) a branch instruction not taken, (ii) a direct branch instruction taken, (iii) an indirect branch address taken, or (iv) a return address taken.

5. The microprocessor as recited in claim 4, wherein the instruction cache is configured to store predecode information for the instruction bytes, wherein the predecode information includes predecode bits indicative of instruction starting bytes.

6. The microprocessor as recited in claim 5, wherein the fetch block size is a constant.

7. The microprocessor as recited in claim 6, further comprising a return stack coupled to said multiplexer and configured to store instruction pointers for instructions immediately following call instructions.

8. The microprocessor as recited in claim 2, wherein said branch selector array and said indirect branch target cache are each set associative and configured to store tags that are compared with the fetch address in order to determine which, if any, stored selector bits and indirect branch target addresses correspond to the fetch address.

9. A method for generating a predicted next fetch addresses in a microprocessor, the method comprising:

receiving a current fetch address;

outputting instruction bytes and predecode information corresponding to the current fetch address from an instruction cache;

outputting selector bits corresponding to the current fetch address from a branch selector array;

adding the current fetch address to a fetch block constant to generate a next sequential address;

outputting a stored indirect branch address from an indirect branch target address cache;

outputting a stored return address from a return stack;

calculating an offset;

summing the current fetch address to the offset to generate a next direct branch address; and selecting one of the following as the predicted next fetch address: (i) the next sequential address, (ii) the output indirect branch address; (iii) the output return address; and (iv) the next direct branch address, wherein said outputting said current fetch address, said outputting said stored indirect branch address, said outputting said stored return address, and said adding the current fetch address to the offset to generate the next direct branch address, are all performed in parallel.

10. The method as recited in claim 9 further comprising:

generating and storing selector bits for instruction bytes stored in an instruction cache; and selecting the predicted next fetch address based upon the selector bits.

11. The method as recited in claim 10 further comprising updating the selector bits based upon the results of branch instructions stored in the instruction cache.

12. The method as recited in claim 11, wherein said calculating comprises:

determining a first particular offset from the current fetch address to a first direct branch instruction from the instruction cache that is predicted taken, detecting a second particular offset stored as immediate data within the first direct branch instruction, and wherein said summing comprises summing the current fetch address, the first offset, and the second offset.

13. The method as recited in claim 12, further comprising using tags to access the selector bits.

14. The method as recited in claim 13, further comprising using tags to access the indirect branch target cache.

15. The method as recited in claim 14, further comprising storing a plurality of predecode bits into the instruction cache, wherein the predecode bits indicate the presence of branch instructions and the presence of offset bytes stored as immediate data in direct branch instructions.

16. A computer system comprising:

an instruction cache means configured to store instruction bytes, wherein the instruction cache means is configured to receive a fetch address and in response thereto output one or more of the instruction bytes corresponding to the fetch address, a branch selector array means configured to store a plurality of selector bits, wherein each selector bit corresponds to a particular instruction byte stored in the instruction cache means, wherein the branch selector array means is configured to receive the fetch address and in response thereto output one or more corresponding selector bits that are indicative of a source for a predicted next fetch address, a sequential address adder means configured to sum the fetch address with a fetch block size to generate a next sequential address, an indirect branch target cache means configured to store predicted branch target addresses for indirect branch instructions stored in the instruction cache means, wherein the indirect branch target cache means is configured to receive the fetch address and output a corresponding indirect branch address, a direct branch adder means configured to sum the fetch address with an offset from the instruction bytes output by the instruction cache means to calculate a direct branch address, and a selector means configured to receive the one or more corresponding selector bits from the branch selector array means, wherein the selector means is configured to select either the next sequential address, the direct branch address, or the indirect branch address based on the selector bits.

17. The computer system as recited in claim 16, wherein the sequential address adder means, the direct branch adder means, and the indirect branch target cache means are each configured to calculate the next sequential address, the direct branch address, and the indirect branch address, respectively, in parallel.

18. The computer system as recited in claim 17, further comprising an offset calculation logic unit configured to calculate the offset from the instruction bytes output by the instruction cache means, wherein the offset calculation logic unit is configured calculate the offset based on the selector bits.

19. The computer system as recited in claim 18, where two of said selector bits correspond to each instruction byte stored in said instruction cache means, wherein said two bytes are indicative of whether the corresponding instruction is (i) a branch instruction not taken, (ii) a direct branch instruction taken, (iii) an indirect branch address taken, or (iv) a return address taken.

20. The computer system as recited in claim 19, wherein the instruction cache means is configured to store predecode information for the instruction bytes, wherein the predecode information includes predecode bits indicative of instruction starting bytes.

21. The computer system as recited in claim 20, wherein the fetch block size is a constant.

22. The computer system as recited in claim 21, further comprising a return stack coupled to said selector means and configured to store instruction pointers for instructions immediately following call instructions.

23. The computer system as recited in claim 17, wherein said branch selector array means and said indirect branch target cache means are each set associative and configured to store tags that are compared with the fetch address in order to determine which, if any, stored selector bits and indirect branch target addresses correspond to the fetch address.

* * * * *